US008533779B2

(12) United States Patent
Cao

(10) Patent No.: US 8,533,779 B2
(45) Date of Patent: Sep. 10, 2013

(54) METHOD FOR PREVENTING IP ADDRESS FROM UNEXPECTED DISPERSION WHEN USING POINT-TO-POINT PROTOCOL

(75) Inventor: Wenli Cao, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 1018 days.

(21) Appl. No.: 11/571,739

(22) PCT Filed: Jul. 5, 2005

(86) PCT No.: PCT/CN2005/000983
§ 371 (c)(1),
(2), (4) Date: Jan. 5, 2007

(87) PCT Pub. No.: WO2006/005249
PCT Pub. Date: Jan. 19, 2006

(65) Prior Publication Data
US 2007/0245405 A1 Oct. 18, 2007

(30) Foreign Application Priority Data
Jul. 8, 2004 (CN) .......................... 2004 1 0028024

(51) Int. Cl.
G06F 7/04 (2006.01)
(52) U.S. Cl.
USPC ............... 726/3; 370/401; 370/522; 709/230; 709/219; 455/461
(58) Field of Classification Search
USPC ............................................................ 726/4
See application file for complete search history.

(56) References Cited

U.S. PATENT DOCUMENTS

| 6,031,848 | A | * | 2/2000 | Brennan | ........................ 370/522 |
| 6,785,823 | B1 | * | 8/2004 | Abrol et al. | ........................ 726/7 |
| 6,792,457 | B1 | * | 9/2004 | Zhang et al. | ................... 709/224 |
| 6,978,128 | B1 | * | 12/2005 | Raman et al. | .............. 455/414.1 |
| 7,072,962 | B2 | * | 7/2006 | Hori | ............................... 709/224 |

(Continued)

OTHER PUBLICATIONS

"Cisco IOS Security Command Reference, Release 12.3", Copyright 2003, Cisco Systems.*

(Continued)

Primary Examiner — Ashok Patel
Assistant Examiner — Gary Gracia
(74) Attorney, Agent, or Firm — Workman Nydegger

(57) ABSTRACT

A method for preventing IP address from unexpected dispersion when using point-to-point protocol is disclosed. The method comprises the steps: starting and initializing a PPP session; performing a PPP LCP negotiation, in which times of the successful PPP LCP negotiation is limited; performing a PPP authentication, in which an authentication request to AAA client is sent only once; performing a PPP IPCP negotiation, in which an accounting-start request is sent only once and times of the successful PPP IPCP negotiation is limited; and terminating the PPP session and releasing the IP address. The method of the invention for preventing IP address from unexpected dispersion when using point-to-point protocol effectively avoid excessive oscillation of a LCP state machine and a IPCP state machine by limiting times of the successful PPP LCP negotiation during the period of PPP LCP negotiation and times of the successful PPP IPCP negotiation. In the meantime, the method the invention effectively solves the problem of IP address unexpected dispersion by sending an authentication request to an AAA client only once during the PPP authentication phase and ensuring that the PPP session sends an accounting-start request only once.

9 Claims, 5 Drawing Sheets

(56) References Cited

U.S. PATENT DOCUMENTS

| | | | |
|---|---|---|---|
| 7,154,868 B1* | 12/2006 | Sharma et al. | 370/331 |
| 7,197,549 B1* | 3/2007 | Salama et al. | 709/223 |
| 7,333,452 B2* | 2/2008 | Lim | 370/331 |
| 7,412,528 B2* | 8/2008 | Mir et al. | 709/230 |
| 7,454,206 B1* | 11/2008 | Phillips et al. | 455/435.1 |
| 7,469,298 B2* | 12/2008 | Kitada et al. | 709/236 |
| 2003/0067923 A1* | 4/2003 | Ju et al. | 370/395.3 |
| 2003/0088679 A1* | 5/2003 | Hori | 709/229 |
| 2003/0099213 A1* | 5/2003 | Lee et al. | 370/328 |
| 2004/0059821 A1* | 3/2004 | Tang et al. | 709/228 |
| 2005/0021770 A1* | 1/2005 | Helm et al. | 709/228 |
| 2005/0043028 A1* | 2/2005 | Suomi | 455/435.1 |
| 2005/0243770 A1* | 11/2005 | Devarapalli et al. | 370/331 |
| 2005/0266842 A1* | 12/2005 | Nasielski et al. | 455/432.1 |
| 2006/0002397 A1* | 1/2006 | Xue et al. | 370/395.2 |

OTHER PUBLICATIONS

"Cisco 700 seris Router Command Reference 4.4, Chapter 9 PPP commands", Cisco Systems (End-of Life Announcement Date, Mar. 15, 1999).*

* cited by examiner

US 8,533,779 B2

METHOD FOR PREVENTING IP ADDRESS FROM UNEXPECTED DISPERSION WHEN USING POINT-TO-POINT PROTOCOL

FIELD OF THE INVENTION

The present invention relates to a network access technique, more particularly to a method for preventing Internet Protocol (IP) address from unexpected dispersion when using the Point-to-Point Protocol (PPP).

DESCRIPTION OF THE BACKGROUND ART

Currently, PPP access technique has already become a main method of broadband access application, especially the technical criterion of the PPP Over Ethernet (PPPoE) which is widely supported has become a preferred access method of broadband access operators.

FIG. 1 shows IP address assignment procedure used for a PPP session, which is implemented by a broadband access server. In PPP session an IP address is assigned by the server after an AAA (Authentication, Authorization, Account) client authentication is completed, and is released by the AAA client after an accounting-stop request or an accounting-reject request is sent. An accounting-start request is sent after a negotiation of PPP Internet Protocol Control Protocol (PPP IPCP) has completed, and the accounting-stop request may be sent only after the accounting-start request being sent. The accounting-reject request is sent before the accounting-start being sent when an exception occurs in the PPP session. The accounting-reject request does not send an accounting packet to a server of Remote Authentication Dial In User Service (RADIUS), as it is a mere local exception processing procedure, but not a RADIUS protocol standard.

However, unexpected dispersion of IP address used for PPP session occurs frequently when the broadband access server providing the PPP access service to result in the fact that IP address available for customer decrease, even no available IP address to be used. The problem of the prior art is caused due to the complexity of a PPP state machine. After the negotiation phase and authorization phase of the Link Control Protocol (LCP) are completed, the server has already assigned an IP address for a customer. Therefore, an oscillation of a LCP state machine and a IPCP state machine may be caused once a negotiation packet of LCP and IPCP is sent again, that is, a PPP session may be authenticated again and again if it may be negotiated repeatedly. In the case of the repeat for the authentication of PPP session, a customer may be assigned many IP addresses to be unexpected, which is called unexpected dispersion of IP address. There is not any available solution for settling this problem of the prior art in current PPP protocol and other protocol standards.

SUMMARY OF THE INVENTION

An object for the present invention is to provide a method for preventing IP address from unexpected dispersion when using point-to-point protocol.

To achieve the objective the method for preventing IP address from unexpected dispersion when using point to point protocol of the invention can be realized by limiting times of successful PPP LCP negotiation, sending authentication request to AAA client only once in PPP authentication, sending accounting-start request only once after IPCP negotiation is completed, and limiting times of successful PPP IPCP negotiation in IPCP negotiation.

The method further comprises a) starting and initializing a PPP session; b) performing a PPP LCP negotiation between a terminal of customers and the PPP, in which times of the successful PPP LCP negotiation is limited; c) performing a PPP authentication in order to assign a IP address from a AAA client only once by sending an authentication request to the AAA client only once; d) performing a PPP IPCP negotiation between the PPP and the AAA client, in which an accounting-start request is sent only once and times of successful PPP IPCP negotiation is limited; e) releasing the IP address after the PPP session is terminated.

According to the method of the invention, the step of initializing the PPP session comprises setting "FAILURE" for the initialized value of the authentication success flag; setting "NOT SENT" for the initialized value of the sending accounting-start request flag; clearing the count of successful LCP negotiation; clearing the count of successful IPCP negotiation; and setting "NOT SENT" for the initialized value of the flag for sending authentication request to AAA client.

According to the method of the invention, the step of performing the PPP LCP negotiation between a terminal of customers and the PPP comprises determining whether LCP negotiation is successful; adding 1 to the count of successful LCP negotiation if the LCP negotiation is determined to be successful; otherwise, terminating the PPP session; determining whether the count of successful LCP negotiation exceeds an allowed maximum times so that the PPP authentication could be activated if not or the PPP session could be activated if so. The LCP negotiation is determined to be successful if the state of PPP LCP state machine is "OPENED". The allowed maximum times of successful LCP negotiation is 3.

According to the method of the invention, the step of performing a PPP authentication comprises sending an authentication request to the AAA client; checking the authentication success flag for determining whether the authentication is successful or not; sending a successful authentication packet to the terminal for response the customer if the authentication is successful to activate the PPP IPCP negotiation; checking the flag for sending authentication request to AAA client and further determining whether the value of the flag is "SENT"; sending the authentication request to the AAA client and setting "SENT" for the value of the flag for sending authentication request to AAA client if the value of the flag for sending authentication request to AAA client is not "SENT"; waiting for the result of the authentication replied by the AAA client if the value of the flag is "SENT"; determining whether the result of authentication request returned from the AAA client is successful or not; checking whether the state of the LCP state machine is "OPENED" if the result of authentication request is determined to be successful; informing the AAA client to release IP address if the state of the LCP state machine is not "OPENED" to terminate the PPP session; setting "SUCCESS" for the value of a authentication success flag and send a successful authentication packet to the customer; and activating the PPP session termination procedure.

According to the method of the invention, the step of performing a PPP IPCP negotiation between the PPP and the terminal of customers comprises activating the IPCP negotiation procedure; determining whether the IPCP negotiation is successful or not; adding 1 to the count of successful IPCP negotiation if the IPCP negotiation is determined to be successful; determine whether the count of successful IPCP negotiation exceeds an allowed maximum times or not; checking a sending accounting-start request flag if the count of successful IPCP negotiation does not exceed the allowed maximum times; otherwise, terminating the PPP session;

determining whether a sending accounting-start request has been already sent; setting "SENT" for the sending accounting-start request flag at first and sends accounting-start request to the AAA client if the sending accounting-start request has not been sent; otherwise, not proceeding with any process. The IPCP negotiation is determined to be successful if the state of PPP IPCP state machine is "OPENED". The allowed maximum of successful IPCP negotiation is 3.

According to the method of the invention, the step of releasing the IP address comprises closing PPP session; checking the authentication success flag and further determining whether the value of the authentication success flag is "SUCCESS"; checking the flag for Sending Accounting-Start Request in order to determine whether the Accounting-Start request has been already sent if the value is determined as "SUCCESS"; otherwise, releasing the PPP session; sending an accounting-stop request to the AAA client and releasing the IP address at the same time if the accounting-start request has been already sent; sending an accounting-reject request and releasing the IP address at the same time if the accounting-start request has not been already sent; releasing the PPP session.

The method of the invention for preventing IP address from unexpected dispersion when using point-to-point protocol effectively avoid excessive oscillation of a LCP state machine and a IPCP state machine by limiting times of the successful PPP LCP negotiation during the PPP LCP negotiation phase and times of the successful PPP IPCP negotiation. In the meantime, the method the invention effectively solves the problem of unexpected dispersion for IP address by sending an authentication request to an AAA client only once during the PPP authentication phase and by ensuring that IPCP the PPP session sends an accounting-start request only once.

BRIEF DESCRIPTION OF THE DRAWINGS

The present invention will now be described in details with accompanying drawings and preferred embodiments, which however, won't be used as a limitation to the invention.

DETAILED DESCRIPTION OF THE PREFERRED EMBODIMENTS

An exemplary embodiment of the present invention will now be described in detail with reference to the drawings.

The method of the invention aims to prevent IP address from unexpected dispersion in a PPP session so that access server assigns IP address in the PPP session correctly and may provide reliable PPP service.

Figure 1:
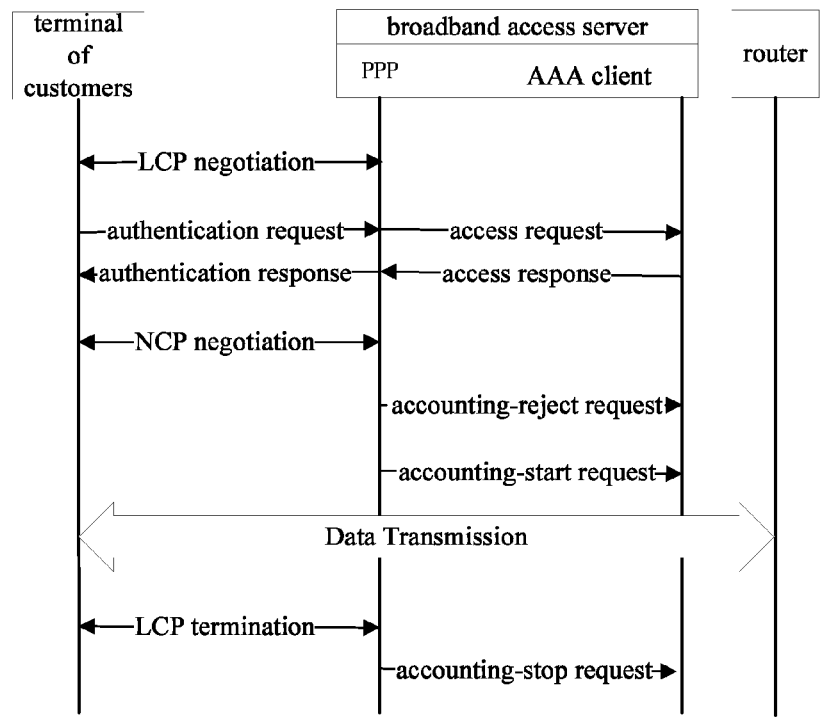
FIG. 1 is a diagram of IP address assignment procedure of a PPP session in related arts.
Figure 2:
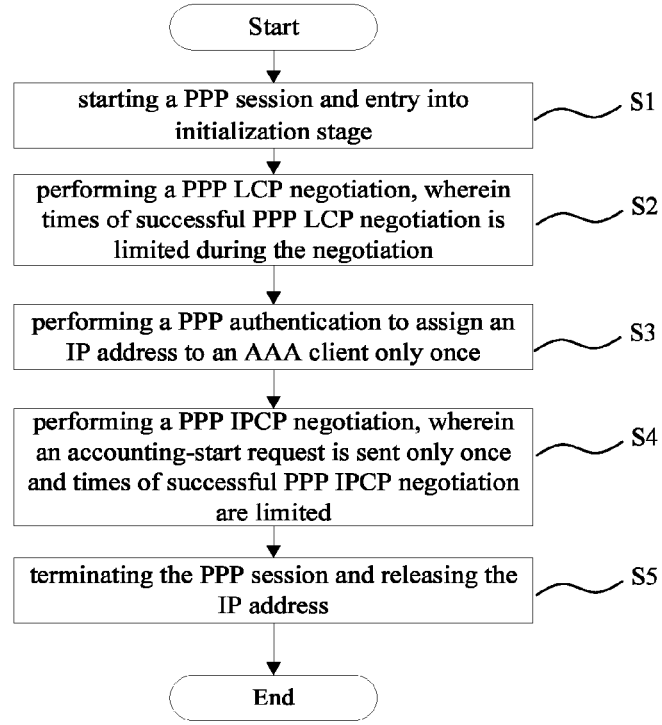
FIG. 2 is a flow chart of the invention.

Now referring to FIG. 2, the operating procedure of the invention is described in detail.

In Step S1, the method according to the invention firstly enters into initialization stage after a PPP session is start.

In Step S2, a PPP LCP negotiation is performed between a terminal of customers and the PPP session. Times of successful PPP LCP negotiation is limited during the negotiation.

In Step S3, a PPP authentication is performed in order to assign an IP address from an AAA client by sending an authentication request to the AAA client only once.

In Step S4, a PPP IPCP negotiation is performed between the PPP and the AAA client. An accounting-start request is sent only once and times of the successful PPP IPCP negotiation are limited.

In Step S5, the IP address is released after the PPP session is terminated.

Figure 7:
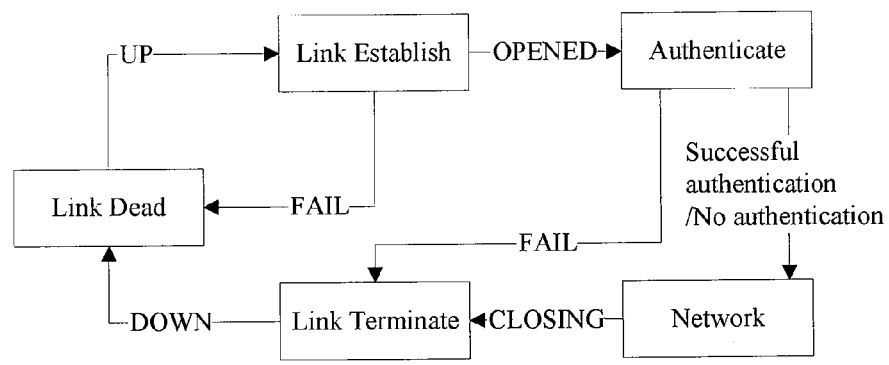
FIG. 7 is a diagram of PPP session state machine of the invention.

The steps above are processed according to session procedure of PPP protocol exactly, as shown in FIG. 7. The step S1, S2, S3, S4 and S5 are respectively corresponding to a stage of link initialization, a stage of link establishment, a stage of authentication, a stage of network layer, and a stage of link termination.

The server may perform the initialization after allocating resource for the PPP session. In the stage of PPP session initialization, flags and counts are initialized respectively.

Firstly, the following flags and counts are used in the PPP session in accordance with the invention, comprising an authentication success flag, for identifying whether the PPP session authentication is successful, which has logic values "FAILURE" and "SUCCESS"; an sending accounting-start request flag, for identifying whether the PPP session has sent accounting-start request to the AAA client, which has logic values "SENT" and "NOT SENT"; a count of successful LCP negotiation, for indicating successful times of LCP negotiation, that is, times of the LCP state machine in UP; a count of successful IPCP negotiation, for indicating successful times of IPCP negotiation, that is, times of the IPCP state machine in UP; a flag for sending Authentication Request to AAA client, for identifying whether an authentication request used for the PPP session has been sent to the AAA client, which has logic values "SENT" and "NOT SENT".

Figure 3:
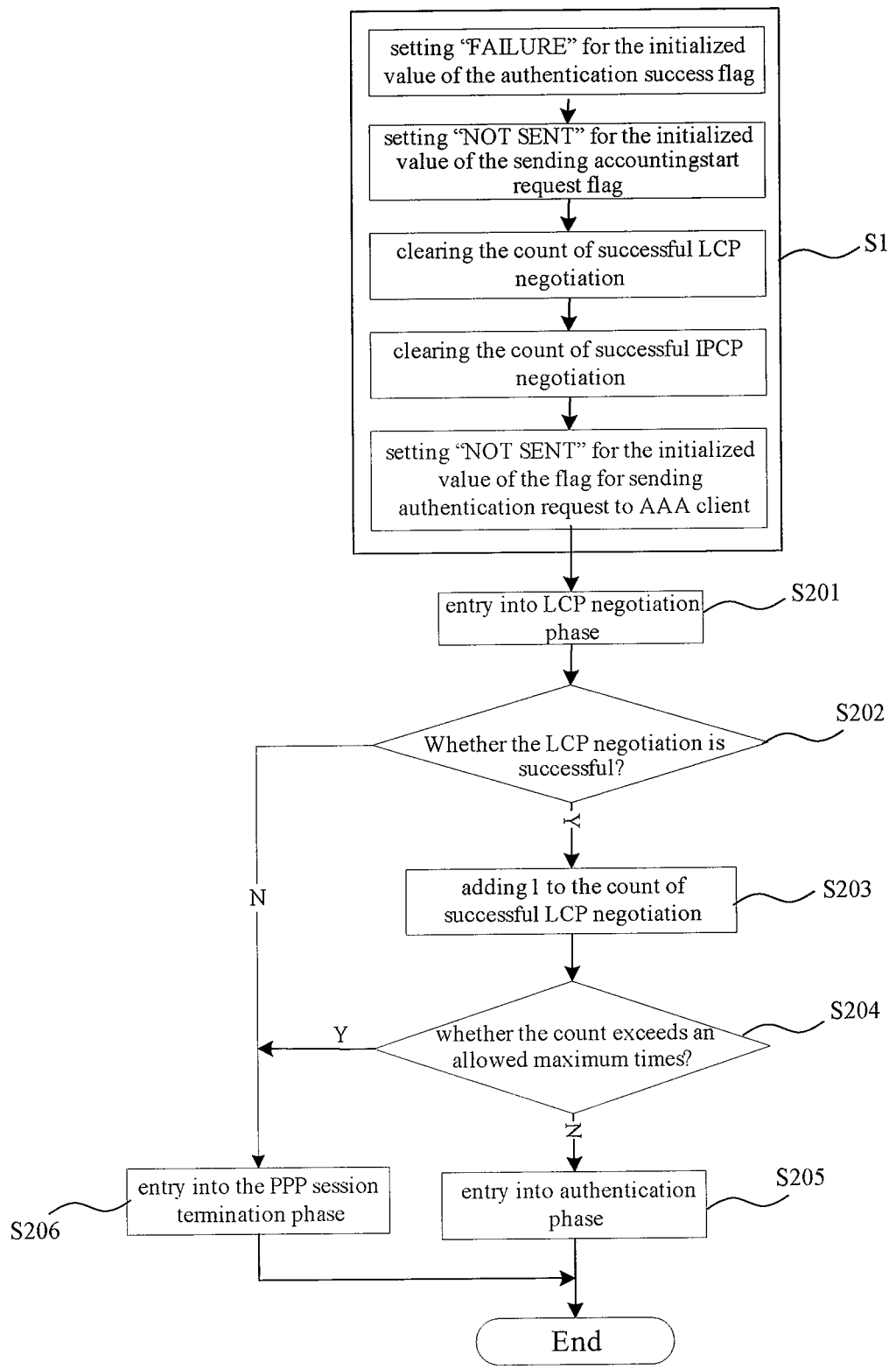
FIG. 3 is a flow chart of PPP LCP negotiation of the invention.

Therefore, the step S1 of initializing the PPP session respectively comprises, as shown in FIG. 3, setting "FAILURE" for the initialized value of authentication success flag; setting "NOT SENT" for the initialized value of sending accounting-start request flag; clearing the count of successful LCP negotiation; and clearing the count of Successful IPCP negotiation; and setting "NOT SENT" for the initialized value of the flag for sending authentication request to AAA client.

As shown in FIG. 3, in the PPP LCP negotiation phase, times of successful PPP LPC negotiation should be limited in order to prevent the LCP state machine from excessive oscillation. The PPP LCP negotiation phase comprises the following steps in details.

In Step S201, the LCP negotiation procedure is activated. Then, in Step S202, the result of the LCP negotiation should be determined according to the state of PPP LCP state machine. Thus, the LCP negotiation is determined to be successful if the state of PPP LCP state machine is "OPENED". In next step S203, the count of successful LCP negotiation should be added into 1 accordingly in order to record times of successful LCP negotiation if the LCP negotiation is determined to be successful. Of course, the allowed maximum times for successful LCP negotiation according to the invention is 3. Therefore, in Step S204, it is necessary for the method of the invention to determine whether the count of successful LCP negotiation exceeds 3 or not, the allowed maximum times. If not, the authentication procedure is activated in next Step S205 (that is the step S3). However, the PPP session termination procedure is activated if the LCP negotiation is determined to be unsuccessful or if the count of successful LCP negotiation exceeds 3.

Figure 4:
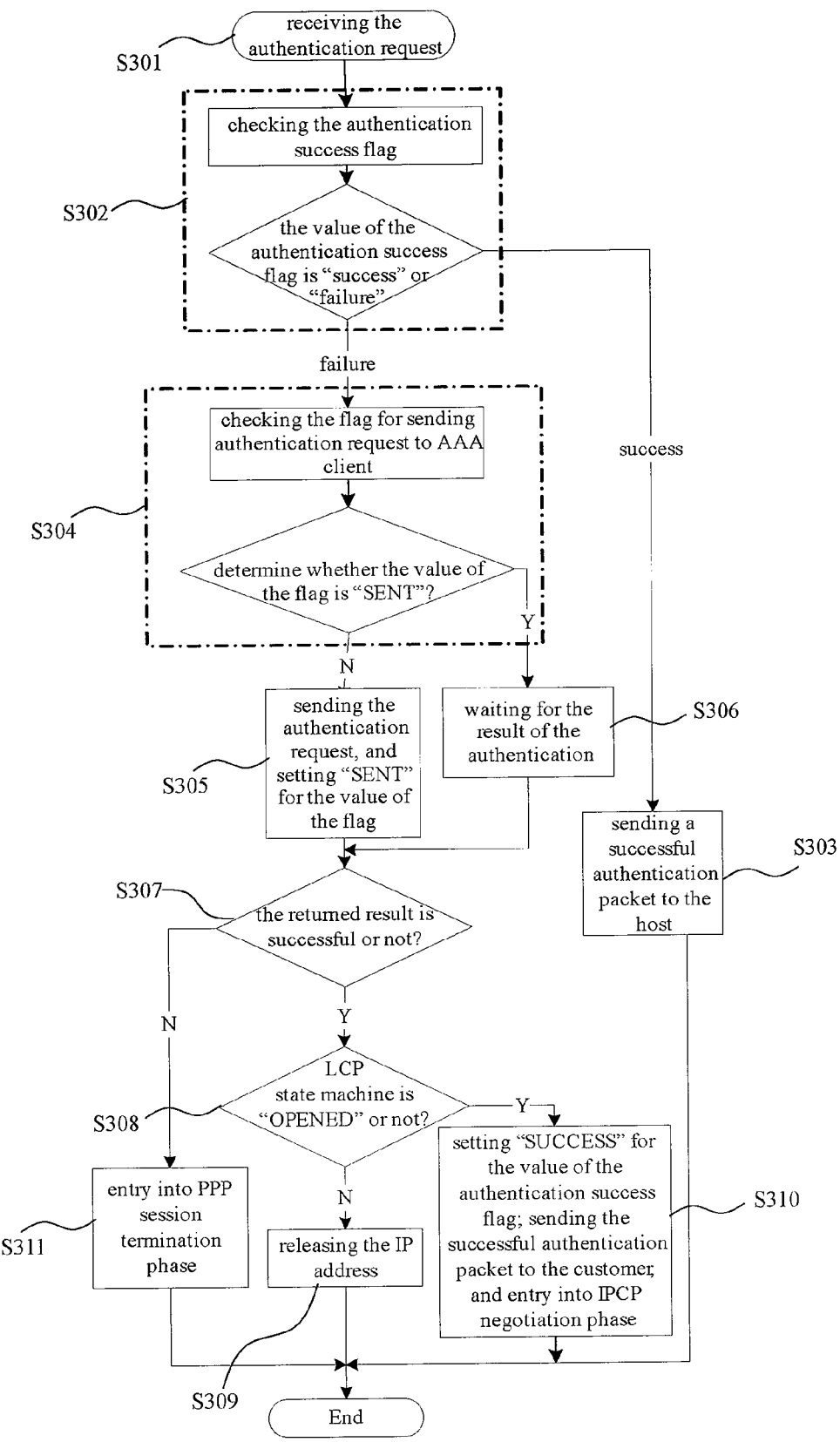
FIG. 4 is a flow chart of PPP authentication of the invention.

In the PPP authentication phase, the authentication request is sent to AAA client only once in order to ensure that IP address is assigned from the AAA client only once according to the method of the invention. As shown in FIG. 4, the PPP authentication phase, that is the step S3, comprises the following steps in details.

First of all, in Step S301, the PPP session receives the authentication request. Then, in Step S302, the PPP session needs to check the Authentication Success Flag for determining whether the authentication is successful or not. If the authentication is successful, the server sends a successful authentication packet to the terminal in Step S303 for response the customer; otherwise, the server checks the flag for sending authentication request to AAA client and further determine whether the value of the flag is "SENT" in Step S304. If not, the server sends the authentication request to the AAA client and sets "SENT" for the value of the flag for sending authentication request to AAA client in Step S305. If the value of the flag is "SENT", the server waits for the result of the authentication replied by the AAA client in Step S306. After Steps S305 and Step S306 being proceeded, AAA client can further response to the authentication request. Therefore, the server further determines whether the result of authentication request returned from the AAA client is successful or not in Step S307. If so, the server needs to check whether the state of the LCP state machine is "OPENED" in Step S308. However, the server can further inform the AAA client to release IP address in Step S309 if the state of the LCP state machine is not "OPENED"; otherwise, the server sets "SUCCESS" for the value of the authentication success flag and send the successful authentication packet to the customer in Step S310. Thus, the server may enter into a PPP IPCP negotiation phase. Furthermore, the PPP session termination procedure is activated in Step S311 if the result of authentication request returned from the AAA client is unsuccessful.

Figure 5:
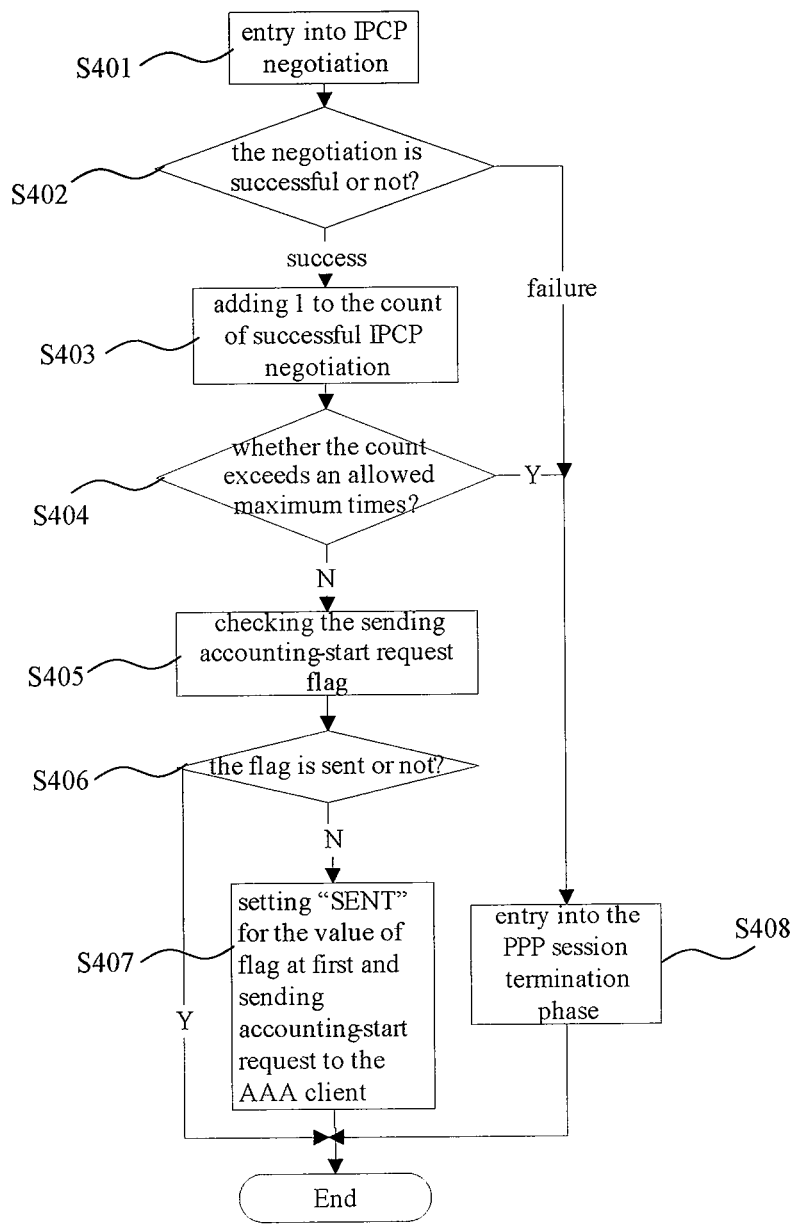
FIG. 5 is a flow chart of PPP IPCP negotiation of the invention.

In the PPP IPCP negotiation phase the server avoids excessive oscillation of an IPCP state machine by ensuring that the PPP session sends an accounting-start request only once and limiting times of successful PPP IPCP negotiation. Referring to FIG. 5, PPP IPCP negotiation phase will be described in detail.

In Step S401, the IPCP negotiation procedure is activated. Then, in Step S402, the result of the IPCP negotiation should be determined according to the state of PPP IPCP state machine. Thus, the IPCP negotiation is determined to be successful if the state of PPP IPCP state machine is "OPENED". In next step S403, the count of successful IPCP negotiation should be added into 1 accordingly in order to record times of successful IPCP negotiation if the IPCP negotiation is determined to be successful. Of course, the allowed maximum times for successful IPCP negotiation according to the invention is 3. Therefore, in Step S404, it is necessary for the method of the invention to determine whether the count of successful IPCP negotiation exceeds 3 or not, the allowed maximum times. If not, the server checks the sending accounting-start request flag in step S405 for further determining whether the accounting-start request has been already sent in next step S406. Of course, the server does not proceed with any process if the request has been already sent. If not, however, the server sets "SENT" for the value of sending accounting-start request flag at first and the PPP session sends accounting-start request to the AAA client in Step S407. Thereby, the PPP session according to the method of the invention is established successfully and enters into the stage of PPP data transmission in Step S408. However, the PPP session termination procedure is activated if the IPCP negotiation is determined to be unsuccessful or if the count of successful IPCP negotiation exceeds 3.

Figure 6:
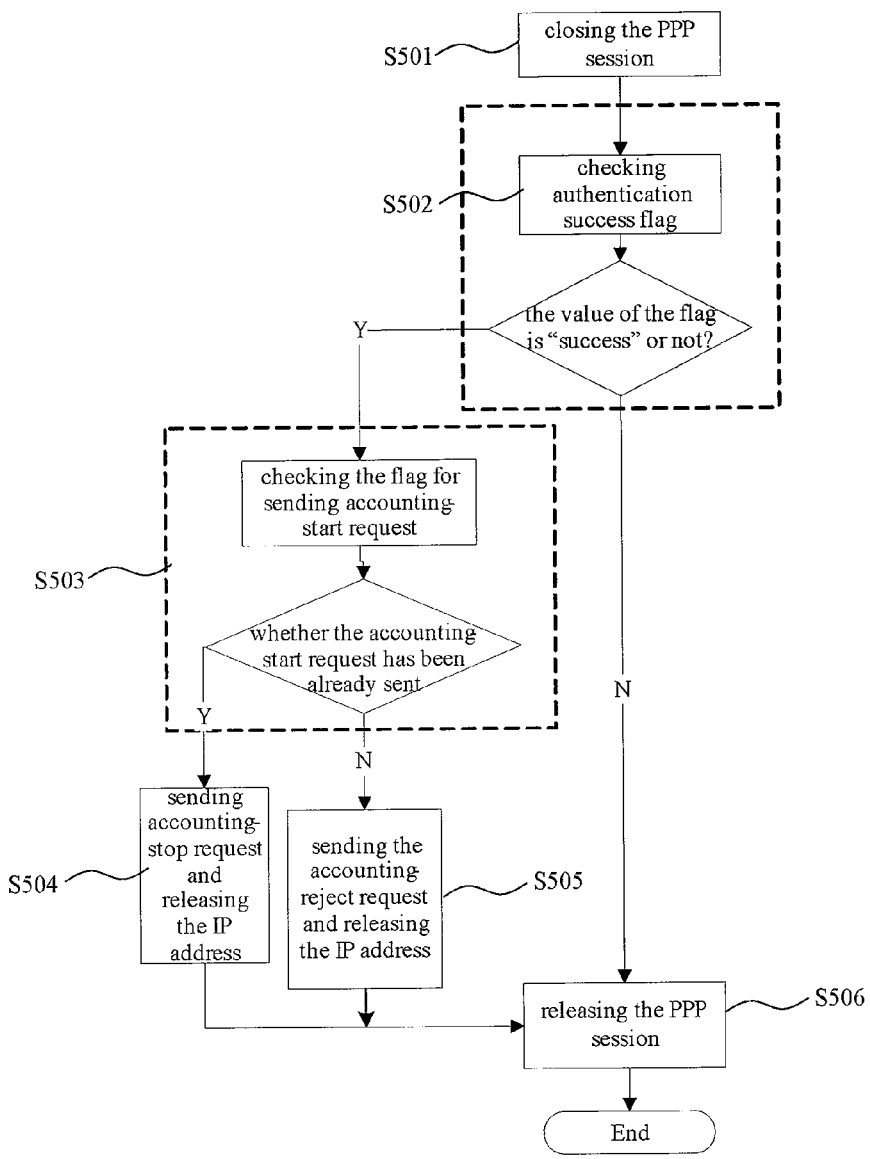
FIG. 6 is a flow chart of PPP session termination of the invention.

In the PPP session termination phase, the IP address should be released, referring to FIG. 6. In Step S501, the PPP session is closed at first. Then, the server checks the authentication success flag and further determines whether the value of the authentication success flag is "SUCCESS" in Step S502. If so, the server checks the flag for sending accounting-start request in order to determine whether the accounting-start request has been already sent in Step S503. Next, the PPP session sends accounting-stop request to the AAA client and the AAA client releases the IP address at the same time in Step S504 if the accounting-start request has been already sent; otherwise, the PPP session sends the accounting-reject request and the AAA client releases the IP address at the same time. Finally, the server releases the PPP session in Step S506. Of course, the server can also release the PPP session if the value of the Authentication Success Flag is determined as "FAILURE" in Step S502.

It can be understood by those ordinary skilled in the art that variants and modifications can be made to the invention without departing from the spirit and the scope of the present invention. Therefore the foregoing constructed illustrative but not limitation embodiment and its variant equivalents are all fall in the fundamental principles or the scope of this invention.

INDUSTRY APPLICATION

The method of the invention for preventing IP address from unexpected dispersion when using point to point protocol can effectively avoid excessive oscillation of a LCP state machine and a IPCP state machine by limiting times of the successful PPP LCP negotiation during the period of PPP LCP negotiation and times of the successful PPP IPCP negotiation. In the meantime, the method the invention effectively solves the problem of IP address unexpected dispersion by sending an authentication request to an AAA client only once during the period of PPP authentication and ensuring that IPCP sends an accounting-start request.

What is claimed is:

1. A method for preventing IP address from unexpected dispersion when using point-to-point protocol, the method comprising:
   starting and initializing a PPP session;
   performing a PPP LCP negotiation between a terminal of customers and the PPP session, in which times of successful PPP LCP negotiation in PPP LCP negotiation phase is limited, wherein the times of successful PPP LCP negotiation refers to the times that a PPP LCP state machine enters an "OPENED" state; if the times of the successful PPP LCP negotiation exceeds an allowed maximum times of successful PPP LCP negotiation, activating the PPP session termination procedure, wherein performing a PPP LCP negotiation between a terminal of customers and the PPP session includes:
   determining whether LCP negotiation is successful;
   adding 1 to the count of successful LCP negotiation if the LCP negotiation is determined to be successful; otherwise, terminating the PPP session; and
   determining whether the count of successful LCP negotiation exceeds an allowed maximum times so that the PPP authentication could be activated if not or the PPP session could be activated if so;
   performing a PPP authentication, in order to assign a IP address from the AAA client only once, sending an authentication request to a AAA client only once by checking, before sending the authentication request, whether the authentication request has ever been sent to the AAA client;

performing a PPP IPCP negotiation between the PPP and the terminal of customers, in which an accounting-start request is sent only once by checking, before sending the accounting-start request, whether the accounting-start request has ever been sent, and limiting times of successful PPP IPCP negotiation, wherein the times of successful PPP IPCP negotiation refers to the times that a PPP IPCP state machine enters an "OPENED" state; if the times of the successful PPP IPCP negotiation exceeds an allowed maximum times of successful PPP IPCP negotiation, activating the PPP session termination procedure, wherein performing the PPP IPCP negotiation between the PPP and the terminal of customers includes:

activating the IPCP negotiation procedure;
determining whether the IPCP negotiation is successful or not;
adding 1 to the count of successful IPCP negotiation if the IPCP negotiation is determined to be successful;
determine whether the count of successful IPCP negotiation exceeds an allowed maximum times or not;
checking a sending accounting-start request flag if the count of successful IPCP negotiation does not exceed the allowed maximum times; otherwise, terminating the PPP session;
determining whether a sending accounting-start request has been already sent; and
setting "SENT" for the sending accounting-start request flag at first and sends accounting-start request to the AAA client if the sending accounting-start request has not been sent; otherwise, not proceeding with any process;
activating the PPP session termination procedure and releasing the IP address after the PPP session is terminated.

2. The method as claimed in claim 1, wherein the step of initializing the PPP session comprises
providing an authentication success flag and setting "FAILURE" for the initialized value of the authentication success flag;
providing sending accounting-start request flag and setting "NOT SENT" for the initialized value of the sending accounting-start request flag;
recording a count of successful LCP negotiation and clearing the count of successful LCP negotiation;
recording a count of successful IPCP negotiation and clearing the count of successful IPCP negotiation; and
providing a flag for sending authentication request to AAA client and setting "NOT SENT" for the initialized value of the flag for sending authentication request to AAA client.

3. The method as claimed in claim 1, wherein the allowed maximum times of successful LCP negotiation is 3.

4. The method as claimed in claim 1, wherein the step of performing a PPP authentication comprises
sending an authentication request to the AAA client;
checking the authentication success flag for determining whether the authentication is successful or not;
sending a successful authentication packet to the terminal for response the customer if the authentication is successful to activate the PPP IPCP negotiation;
checking the flag for sending authentication request to AAA client and further determining whether the value of the flag is "SENT";
sending the authentication request to the AAA client and setting "SENT" for the value of the flag for sending authentication request to AAA client if the value of the flag for sending authentication request to AAA client is not "SENT";
waiting for the result of the authentication replied by the AAA client if the value of the flag is "SENT";
determining whether the result of authentication request returned from the AAA client is successful or not;
checking whether the state of the LCP state machine is "OPENED" if the result of authentication request is determined to be successful;
informing the AAA client to release IP address if the state of the LCP state machine is not "OPENED" to terminate the PPP session;
setting "SUCCESS" for the value of a authentication success flag and send a successful authentication packet to the customer;
activating the PPP session termination procedure.

5. The method as claimed in claim 1, wherein the allowed maximum of successful IPCP negotiation is 3.

6. The method as claimed in claim 1, wherein the step of releasing the IP address comprises
closing PPP session;
checking the authentication success flag and further determining whether the value of the authentication success flag is "SUCCESS";
checking the flag for sending accounting-start request in order to determine whether the Accounting-Start request has been already sent if the value is determined as "SUCCESS"; otherwise, releasing the PPP session;
sending an accounting-stop request to the AAA client and releasing the IP address at the same time if the accounting-start request has been already sent;
sending an accounting-reject request and releasing the IP address at the same time if the Accounting-Start request has not been already sent;
releasing the PPP session.

7. The method as claimed in claim 1, wherein the allowed maximum times of successful LCP negotiation is 3.

8. The method as claimed in claim 1, wherein the allowed maximum times of successful IPCP negotiation is 3.

9. A method for preventing many IP addresses from being assigned to a terminal when using point-to-point protocol, the method comprising:
starting and initializing a PPP session;
performing a PPP LCP negotiation between a terminal of customers and the PPP session in which times of successful PPP LCP negotiation in a PPP LCP negotiation phase are limited, wherein the times of successful PPP LCP negotiation refers to the times that a PPP LCP state machine enters an "OPENED" state; if the times of the successful PPP LCP negotiation exceeds an allowed maximum times of successful PPP LCP negotiation, activating the PPP session termination procedure, thereby preventing excessive oscillation of the PPP LCP state machine, wherein performing a PPP LCP negotiation between a terminal of customers and the PPP session includes:
determining whether LCP negotiation is successful;
adding 1 to the count of successful LCP negotiation if the LCP negotiation is determined to be successful; otherwise, terminating the PPP session; and determining whether the count of successful LCP negotiation exceeds an allowed maximum times so that the PPP authentication could be activated if not or the PPP session could be activated if so;

performing a PPP authentication, in which an authentication request to an AAA client is sent only once by checking, before sending the authentication request, whether the authentication request has ever been sent to the AAA client, in order to assign an IP address only once when the authentication request is successful;

performing a PPP IPCP negotiation between the PPP and the terminal of customers, in which an accounting-start request is sent only once by checking, before sending the accounting-start request, whether the accounting-start request has ever been sent, and limiting times of successful PPP IPCP negotiation in IPCP negotiation phase, wherein the times of successful PPP IPCP negotiation refers to the times that a PPP IPCP state machine enters an "OPENED" state; if the times of the successful PPP IPCP negotiation exceeds an allowed maximum times of successful PPP IPCP negotiation, activating the PPP session termination procedure, wherein performing a PPP IPCP negotiation between the PPP and the terminal of customers includes:

activating the IPCP negotiation procedure;

determining whether the IPCP negotiation is successful or not;

adding 1 to the count of successful IPCP negotiation if the IPCP negotiation is determined to be successful;

determine whether the count of successful IPCP negotiation exceeds an allowed maximum times or not;

checking a sending accounting-start request flag if the count of successful IPCP negotiation does not exceed the allowed maximum times; otherwise, terminating the PPP session;

determining whether a sending accounting-start request has been already sent; and setting "SENT" for the sending accounting-start request flag at first and sends accounting-start request to the AAA client if the sending accounting-start request has not been sent; otherwise, not proceeding with any process;

activating the PPP session termination procedure and releasing the IP address after the PPP session is terminated.

* * * * *